United States Patent
El-Sayed

(10) Patent No.: US 7,505,819 B2
(45) Date of Patent: Mar. 17, 2009

(54) REDUNDANT FIELDBUS SYSTEM

(75) Inventor: Hassan M. El-Sayed, Manchester (GB)

(73) Assignee: Moore Industries International, Inc., Sepulveda, CA (US)

( * ) Notice: Subject to any disclaimer, the term of this patent is extended or adjusted under 35 U.S.C. 154(b) by 362 days.

(21) Appl. No.: 11/351,144

(22) Filed: Feb. 8, 2006

(65) Prior Publication Data
US 2007/0185588 A1     Aug. 9, 2007

(51) Int. Cl.
| | |
|---|---|
| G05B 11/01 | (2006.01) |
| G06F 11/00 | (2006.01) |
| G01R 31/08 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. .............. 700/21; 714/4; 370/227; 370/228

(58) Field of Classification Search ....... 700/1, 700/21; 370/227–228; 714/4
See application file for complete search history.

(56) References Cited

U.S. PATENT DOCUMENTS

| | | | | |
|---|---|---|---|---|
| 5,757,265 A | * | 5/1998 | Kogure et al. | 340/508 |
| 2002/0184410 A1 | * | 12/2002 | Apel et al. | 710/5 |
| 2003/0117814 A1 | * | 6/2003 | Terakawa et al. | 363/39 |
| 2007/0109958 A1 | * | 5/2007 | Fehrmann et al. | 370/217 |

FOREIGN PATENT DOCUMENTS

WO    WO 2005/032060 A1    4/2005

OTHER PUBLICATIONS

Trunkguard Series 200 Device Coupler; specification.*
Fieldbus Facts Online; May 2005; vol. 6 No. 5.*
MooreHawk, Introduction to Fieldbus, 2006 (www.miinet.com).*
MooreHawke, TRUNKSAFE "In An Eggshell," 2007 (www.miinet.com).*

* cited by examiner

Primary Examiner—Albert DeCady
Assistant Examiner—Darrin Dunn
(74) Attorney, Agent, or Firm—Orrick Herrington & Sutcliffe, LLP

(57) ABSTRACT

A redundant fieldbus redundant system includes two independent conditioned power modules which automatically detect cable faults, such as short or open circuits on both the host and field sides of the network. The power modules are interfaced directly on one side to the primary and backup H1 cards of the host system, and are directly interfaced on the other side to an automatically terminating network device coupler module which provides connections to field devices. The redundant fieldbus system provides power and communications in a parallel physical configuration between the host system and the field devices irrespective of any single point failure in the network. In case of a fault, the redundant fieldbus system automatically eliminates the faulty section of the network, switches power and communications to the healthy portion of the network and terminates the network for signal integrity.

12 Claims, 3 Drawing Sheets

FIG. 4
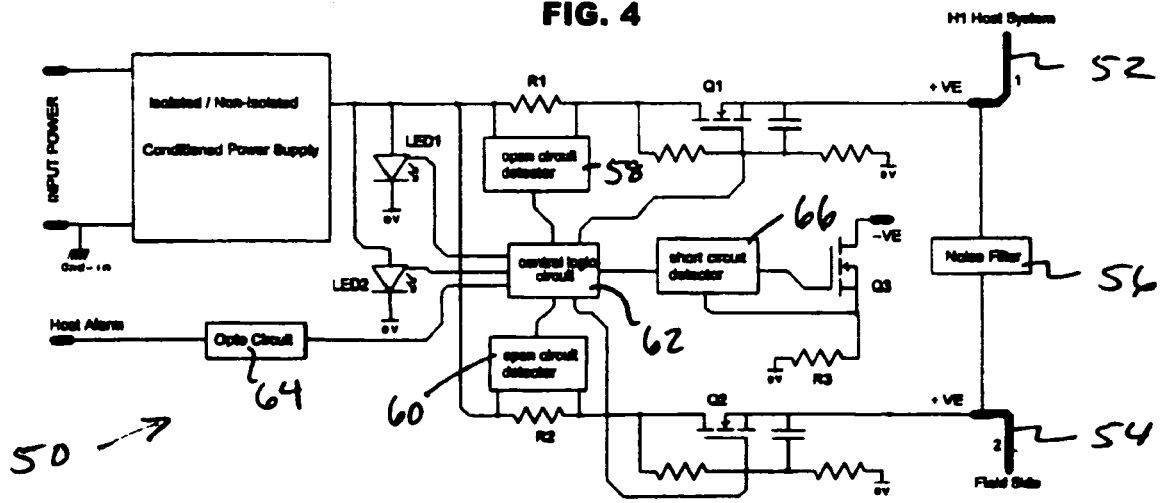
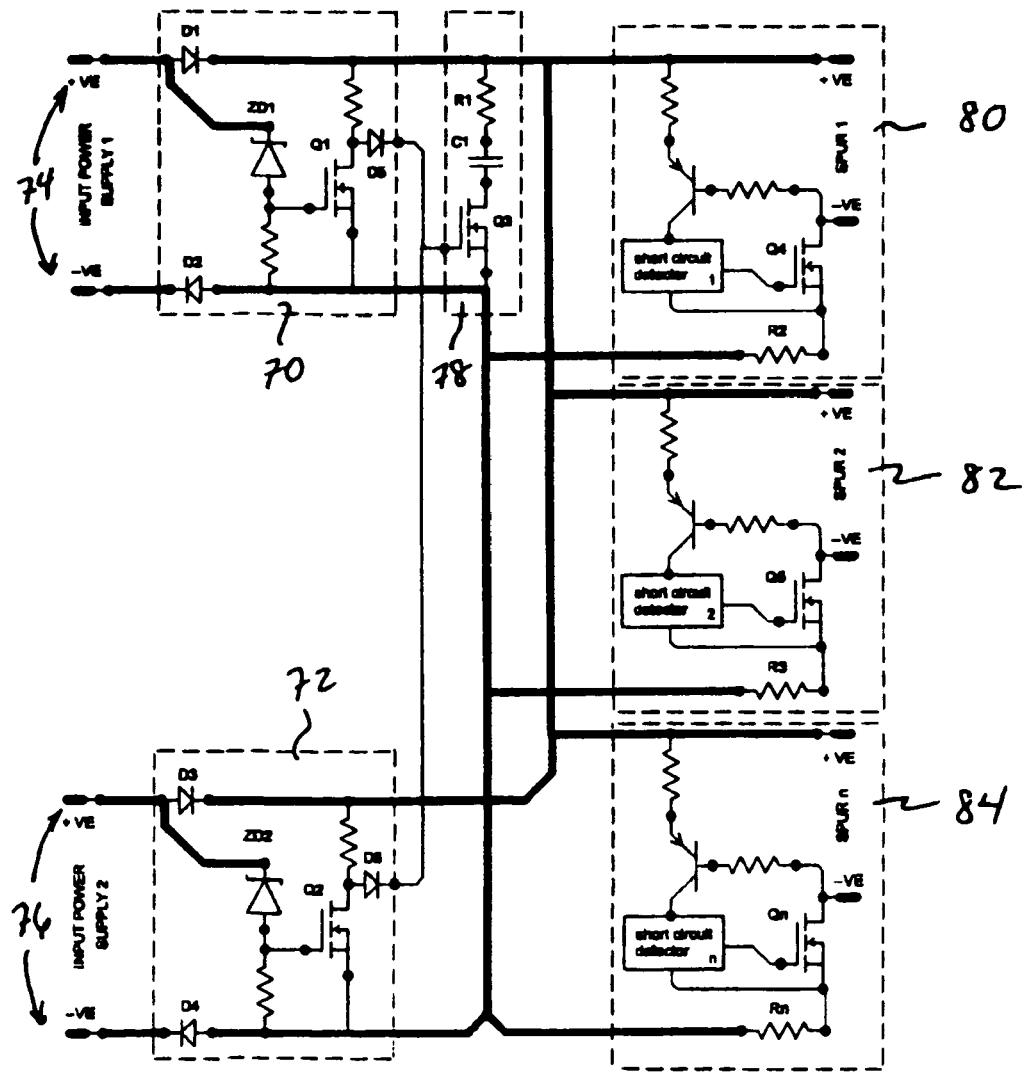
FIG. 5

REDUNDANT FIELDBUS SYSTEM

BACKGROUND

1. Field of the Invention

The present invention relates to an automation or control network such as a fieldbus network that facilitates an extended level of redundancy such as redundancy within the power distribution facilities of a fieldbus network.

2. Description of the Related Art

Fieldbus networks are advantageously used in industrial control systems and particularly in industrial control systems that provide distributed control incorporating field devices having local processors. A fieldbus network is a two-wire network capable of delivering DC power to remotely installed field devices and capable of providing bidirectional digital communications between the remote field devices and the host system. The digital communications are typically carried on a 31.25 kHz carrier signal in the standard-defined H1 fieldbus network. Various field devices might be attached to be powered from and communicate over the network, including controllers, actuators and sensors. Multiple field devices can be attached to one fieldbus segment. The fieldbus is typically implemented on the physical level as two wire shielded cable. More details about conventional aspects and implementations of fieldbus networks can be found in the International Electrotechnical Commission standard IEC 61158-2 which is specifically for industrial networks and promoted by the FOUNDATION Fieldbus and PROFIBUS organizations.

On the host system side of the fieldbus network, primary and backup H1 cards are mounted as front end interface modules to the networked field devices to provide continuous communications. The backup H1 card provides redundancy and takes over the communications between the host and the field devices in case the primary H1 card fails due to any reason. Each H1 card might be configured to provide more than one channel or more than one segment per card; it depends on the manufacturer.

For simplicity, the following discussion refers to one fieldbus segment per H1 card, but implementations can readily provide more segments per card. In a conventional system, the output connection of the primary and the backup H1 cards can be linked together at the host system so that one single two-wire cable can be interfaced directly between the conditioned power modules and the H1 cards. In some other implementations, both H1 cards can be wired individually to the conditioned power modules so that the common link between the cables is made at the power modules. The latter method is used to provide an additional cable redundancy between the H1 cards and the conditioned power modules.

The conditioned power modules also provide DC power to remote field devices via a single two-wire cable connected to an electronic device coupler. Some types of conditioned power modules are designed with a redundancy feature in a similar fashion to H1 cards. When two conditioned power supplies with this redundancy feature are connected in parallel to the networked field devices, both power supply modules operate together and share the same load. If either of the power supply modules fails, the remaining, healthy power supply module will supply the extra power to the load (i.e., the field devices).

In a fieldbus network, the communication signals should be terminated at both ends of the network cable. A matching terminator circuit is fitted at the front end of the power module, and another matching terminator circuit is mounted at the last node of the network. A typical network may have multiple drop or spur connections that each interface to one or more local field devices.

FIG. 1 is a schematic circuit diagram that illustrates the common method of installation recommended by the IEC 61158-2 standard. FIG. 1 shows a fieldbus network 10 in which all field devices D1, Dn (n could be up to 32 devices per segment) are linked to the host through primary H1 card 12 and backup H1 card 14 and through the single cable 16. Cable 16 and the communication signals are terminated at both ends of the cable network by terminators T1 and T2. Primary conditioned power supply module 18 and secondary conditioned power supply module 20 are connected in parallel to bus 16 so as to share the load of the field devices D1, Dn. As illustrated, field devices may be connected to the network cable 16 through a device coupler 22. Typical device couplers 22 provide a standardized interface that allows for easier connection of spurs or individual field devices to the network cable 16. Some device couplers provide fuses or current limiting technology to address local faults and to provide local fault indicators. One of the restricting factors in FOUNDATION fieldbus technology is that the physical layer used for the H1 network does not naturally allow for redundancy. This lack of redundancy may in part lead to undesirable expense and down time for the fieldbus network.

SUMMARY OF THE PREFERRED EMBODIMENTS

A particularly preferred embodiment of the present invention provides a fieldbus network comprising first and second power supplies. The first power supply provides independent host and field power supply paths to a host side terminal and to a field side terminal, respectively. The first power supply has a first fault detector circuit coupled to host and field switches adapted to selectively decouple the host and field power supply paths in response to detection of a fault on host and field sides, respectively. The second power supply provides independent host and field power supply paths to a host side terminal and a field side terminal, respectively. The second power supply has a second fault detector circuit coupled to host and field switches adapted to selectively decouple the host and field power supply paths in response detection of a fault on host and field sides, respectively. The fieldbus network includes first and second fieldbus cables coupled in parallel to a field device. The first fieldbus cable is coupled between the field side terminal of the first power supply and the field device. The second fieldbus cable is coupled between the field side terminal of the second power supply and the field device.

BRIEF DESCRIPTION OF THE DRAWINGS

Aspects of the present invention are illustrated in the attached drawings and can be better understood by reference to those drawings in conjunction with the detailed description. The attached drawings form a part of the disclosure.

FIG. 4 schematically illustrates a preferred conditioned power supply module that can be used advantageously in either the FIG. 2 network or the FIG. 3 network.

FIG. 5 schematically illustrates a preferred implementation of a device coupler that can be used advantageously in either the FIG. 2 network or the FIG. 3 network.

DETAILED DESCRIPTION OF THE PREFERRED EMBODIMENTS

The typical fieldbus system is robust. Unfortunately, the typical fieldbus system has a weakness in that the system uses a single power cable. The power and the communications signals for the fieldbus depend on the integrity of that single, twisted-pair cable between the host and the remote field devices. In conventional implementations, any cable fault will result in the unavailability of not only any associated field device but of all field devices on that network. As a result, the system loses its control and communications with the field devices. To improve the reliability, availability and safety of fieldbus systems, the network cable needs to be fully protected and maintained. Alternately, a fieldbus system may be made completely and automatically redundant by supplying the network with cable fault detection and automatic signal termination.

Preferred aspects of the invention can be combined to provide complete fieldbus network redundancy from the front end interface of the H1 cards to the field devices, preserving network availability and continuous control over the process without user intervention. Preferred aspects of the present invention allow the fieldbus network to provide redundant cable runs that are independently available to the field devices. Other aspects of the invention can be used to automatically terminate the network cable to preserve signal integrity in the field if a power loss occurs on either the host or field side of the connection network. Any detected cable fault is preferably reported to the user, and the system preferably automatically directs communication signals to the healthy (no cable fault) path of the network to maintain the process under control. Preferred implementations of the system allow hot swapping of faulty items, such as power modules, H1 cards and cables without any downtime in the process associated with the fieldbus network. Preferred embodiments of the invention also offer a high degree of safety to critical application loops and full access to uninterruptible continuous process measurement.

Figure 1:
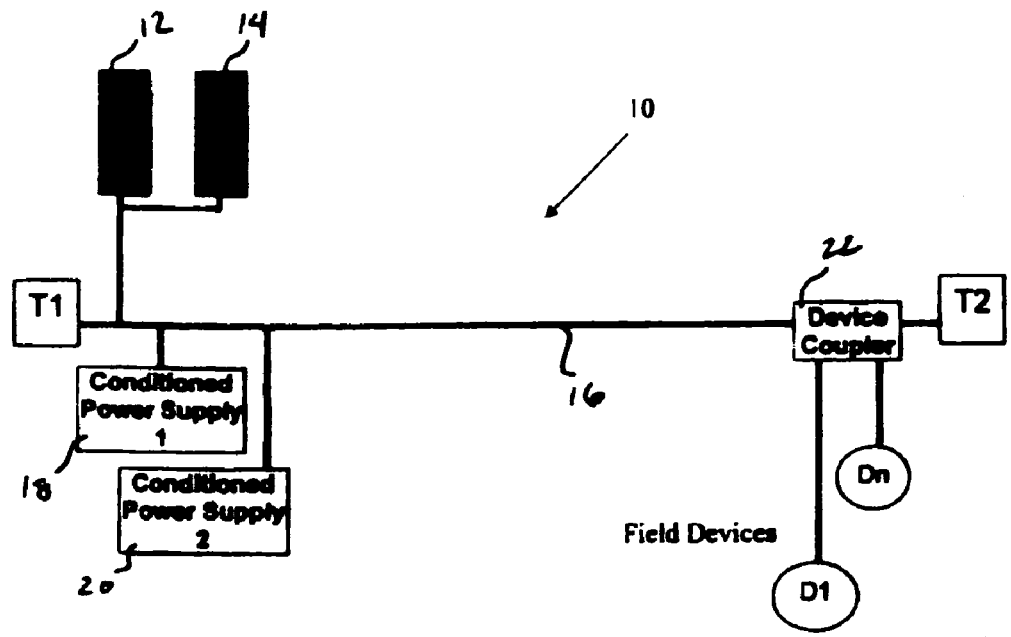
FIG. 1 schematically illustrates a conventional configuration of a fieldbus system according to the IEC 61158-2 standard.
Figure 2:
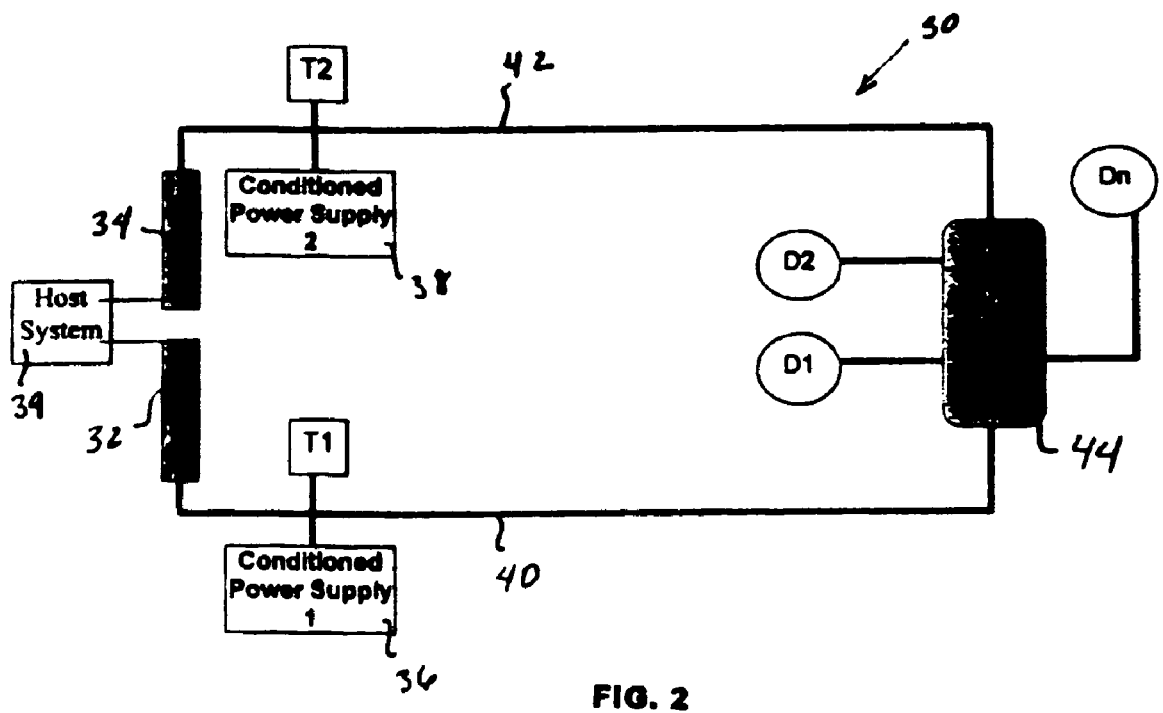
FIG. 2 schematically illustrates a preferred configuration of a redundant fieldbus network according to the present invention.

FIG. 2 shows a schematic diagram of a preferred implementation of a redundant fieldbus system 30. In the FIG. 2 system, a primary H1 card 32 and a backup H1 card 34 within a redundant pair are connected to respective legs of the segment, fed into respective conditioned power supplies 36, 38 and wired out into the field. The primary and backup H1 cards provide the interface to the host control system 39. Each outlet cable 40, 42 is wired to a common device coupler 44 located close to the field devices D1, D2 and Dn. Here again, n represents the number of field devices such as controllers, actuators or sensors, and can be up to, for example, 32 field devices per segment. Here, the illustrated cables are any cables appropriate to the fieldbus network and are typically two-wire cables. The device coupler 44 is then wired to various field devices D1, D2 and Dn required by the process associated with the network 30. Segment termination T1, T2 is provided at the front end of each conditioned power supply 36, 38, so that the fieldbus network is fully terminated at each end. The illustrated network configuration provides a primary and redundant interface card, conditioned power supply and cable to the device coupler 44 so that the device coupler has a complete set of redundant facilities. This ensures that the device coupler 44 can provide power and communications to its connected field devices over independent paths.

Figure 3:
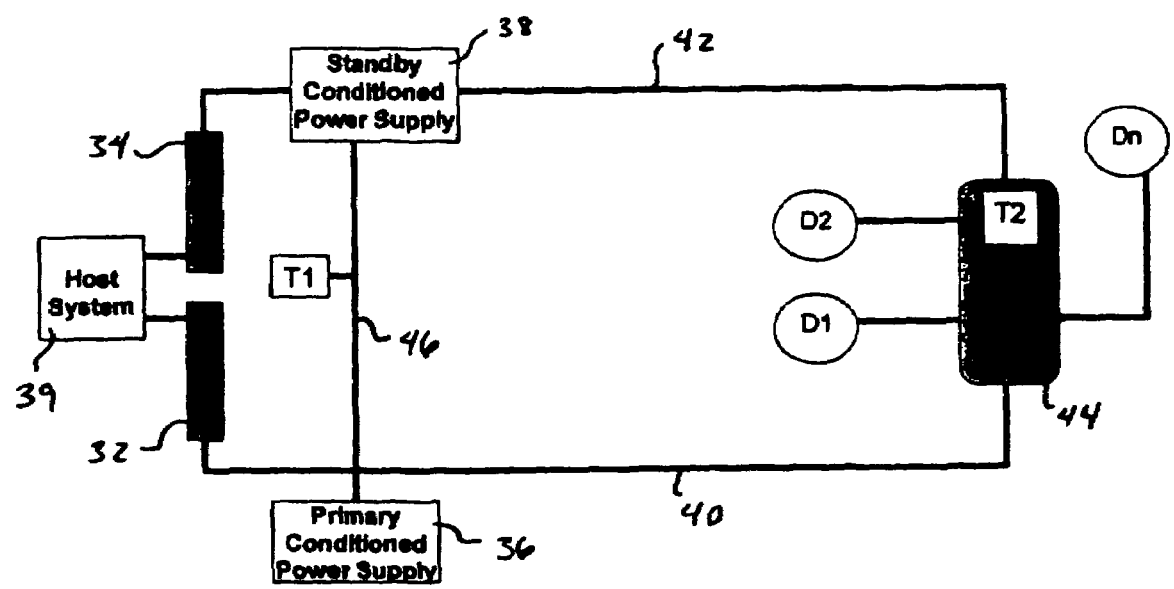
FIG. 3 schematically illustrates another preferred configuration of a redundant fieldbus network according to the present invention.

Redundancy can also be achieved as shown in FIG. 3. Note that the components of the illustrated FIG. 3 fieldbus network are generally the same as are illustrated in the FIG. 2 network and so these components are designated with the same numerals in FIGS. 2 and 3 and the above discussion is not repeated here. The primary 32 and the redundant 34 H1 cards are connected to the conditioned power modules, 36, 38 (primary and standby modules respectively), and a hardwire link 46 is made between the power modules 36, 38. Each outlet cable 40, 42 is wired to a common device coupler 44 located close to the field devices D1, D2 and Dn. Communications are provided via one cable at a time, while the other cable is kept in a standby state. If a cable fault occurs along the primary field cable 40, the standby power module 38 will supply power to the device coupler 44 via cable 42 so that all field devices are kept powered. The process operates in the opposite order if the cable 42 has been made the primary cable and then suffers a failure, the conditioned power supply 36 will supply power to the device coupler 44 over the cable 40 to keep the field devices powered. Front end segment terminator T1 is located at the power modules or at H1 cards, while the other segment terminator T2 is positioned inside the device coupler 44.

Each of the conditioned power supply modules 36, 38 preferably used in the FIG. 2 or FIG. 3 network most preferably incorporates an electronic circuit 50 like that shown in FIG. 4. Each of the preferred power supply modules 36, 38 (FIGS. 2, 3) delivers power to both the host system side and the remote field devices via two independent cables, 52 and 54, respectively. Note here that FIG. 2 schematically shows a continuous cable 40, 42 connecting the H1 interface card 32, 34 to the conditioned power supply module 36, 38 and through the device coupler 44 to the field devices D1, D2 and Dn. The actual implementation that is presently preferred for use in the FIGS. 2 and 3 networks is as illustrated in FIG. 4, where the field side cable 54 connects to the host side cable 52 through an inline noise filter 56, with the field and host side cables powered through substantially independent paths, as shown in FIG. 4.

Filter 56 most preferably couples the bidirectional communication signals between the cables 52 and 54 and suppresses high frequency noise that might be generated on the field side of the network. Power is supplied from module 50 (or 36 and 38 in FIGS. 2, 3) over the substantially independent paths within the FIG. 4 power module so that noise advantageously is not coupled to or from the host or field sides of the network. Most preferably, the power supply 50 can independently isolate cable faults on either the host or field side cables. Each power supply 50 is fitted with two electronic circuits 58, 60 that function as open circuit detectors to detect cable discontinuities or other faults on either the host system side 52 or the field side 54. The open circuit detectors 58, 60 measure the currents delivered to the host load and the field load across resistors R1 and R2, respectively.

In normal operation of the FIG. 4 power supply circuit, the host and field sides should draw minimum currents from the supply so that the open circuit detectors measure currents at or above the threshold values representing normal operation of a network free of cable faults. If at any time the drawn current on either the host or field side drops below the threshold values, the respective open circuit detector 58 or 60 sends an alarm to the control logic circuit 62 indicating a cable fault. The control logic circuit 62 detects the alarm signal and determines from which side (host or field) the cable connectivity was lost. Upon detecting a loss of cable continuity or other fault, the control logic circuit 62 releases two alarms, one local and one remote to the user. The local alarm is sent to a local LED1 that indicates the fault at the conditioned power supply module and the remote alarm is sent to the user system via an optically isolated device 64. The control logic circuit 62 also sends a logic signal to either of the transistors Q1 or Q2 or to both, depending on the type of cable fault, to switch off the supply to indicate the side of the faulty connection or cable.

At the moment when the cable fault is detected "as open circuit," the power supply unit 50 cuts off or ceases supplying power over cable 52 to the connected H1 card so that the H1 card stops functioning. This is accomplished by the control logic circuit 62 causing the transistor Q1 or Q2 or both to become non-conducting on the side or sides of the network the open circuit detectors 58, 60 indicate has a cable fault. When the transistor or transistors is turned off (non-conducting), power is removed from the H1 card on the side of the network with the cable fault and that H1 card is disabled. Since the host controls both the primary 32 and the backup H1 cards 34, the host knows which H1 card is disabled and directs the communication signals via the still-functioning H1 card, presumably the backup H1 card. The host makes the backup H1 card the main communication module for communications with the field devices when the primary H1 card receives no power or loses power. The secondary or redundant conditioned power supply 38 always powers the backup H1 card and the device coupler 44 in the field so that the communication signals will be easily transmitted directly to the field devices and hence all field devices will remain under control.

Still referring to FIG. 4, short circuit detector 66 monitors the cable conditions on both the host system side and the field side for short circuits. The fieldbus network cable can be up to a 1000 meters long on each side (host and field) as described by the IEC61158-2 standard. For the fieldbus network illustrated in FIG. 3, the cable network can be 1900 meters as described in the IEC61158-2 standard. If a cable short circuit or other fault occurs on either side of the network cables, an excessive current will flow through the fault and back through R3. When this current exceeds the limit set by the short circuit detector 66, circuit 66 sends an alarm signal to the control logic circuit 62 and switches off Q3 to isolate the faulty part and limit current drain. The control logic circuit 62 sends two alarm signals, one to a local LED2 to indicate a cable short circuit fault at the conditioned power supply 36, 38 and the other alarm signal is sent to the user via the optically isolated device 64. Q3 stays open circuit as long as the cable is faulty. Once the cable fault is removed, the short circuit detector 66 switches Q3 on automatically. Thus, if a cable short circuit fault is detected on the primary H1 card 32 side, the primary H1 card 32 loses power and consequently the host system redirects the communication signals through the backup H1 card 34. Communication signals are carried over the other, healthy leg of the network as explained above.

FIG. 5 shows a device coupler 44 preferably used in the redundant fieldbus network of FIG. 2 or 3. The device coupler 44 of FIG. 5 is preferably connected to cables 40, 42 and through those cables to power supply modules 36, 38 as shown in FIG. 2 or 3. The device coupler as shown in FIG. 5 includes a diagnostic circuit connected to the primary and redundant network cables to detect when power is lost from the cables connected on the primary and backup sides as power inputs. On detection of a loss of power from either cable, most preferably the auto-terminator circuit is automatically activated to terminate the transmission line to avoid any distortion of the communication signals. Once the cable fault is removed, the auto-terminator preferably is automatically switched off and the system resumes communicating via the whole network. In this reset state the system is fully operational as a closed loop. If a cable short circuit fault develops on either side of the network, then the system communication signals will be diverted to the healthy H1 card side and transmitted via the healthy cable so that all field devices are still powered. The auto-terminator then switches on to allow normal function for the fieldbus devices.

FIG. 5 illustrates a schematic block diagram of the auto-termination circuit. Circuits 70 and 72 monitor the conditions of the input power supplies at both sides of the cable connection terminals. Input power supplies 74 and 76 correspond to the power provided over the cables 40, 42 shown in FIG. 2 or 3. If input power supplies 74 and 76 are present and outputting their values are above the threshold values set by Zener diodes ZD 1 and ZD2 (that is, there is no cable fault and the power supplies 36, 38 are operating), then both Q1 and Q2 are on, which makes Q3 of the terminator network 78 switch off. The cable length on both legs does not affect the functionality of circuits 70 and 72 irrespective of the voltage drops that are likely to occur due to the load (the field devices). The terminator network, circuit 78, includes an impedance matching circuit, which is a terminator resistor R1 connected in series with a terminating capacitor C1. Circuit elements D1, D2, D3, D4, D5, D6 are used for reverse polarity protection.

Once a cable fault (either a short or an open circuit) occurs on either side of the input supplies 74, 76 the voltage at the supplies will be below the threshold values of ZD1 or ZD2 or both, causing Q1 or Q2 to switch off and causing Q3 to switch on. This establishes the auto-terminating function. Once the failed input power is restored and remains above the threshold values of ZD1 and ZD2, Q1 and Q2 switch back to their on conditions, while Q3 switches off and the auto-terminating circuit becomes non-conducting. An alternative auto-terminating circuit that might be used is described in WIPO patent publication WO 2005/032060, which is based on current sensing technology. WIPO patent publication No. WO 2005/032060 is hereby incorporated by reference in its entirety and for all of its relevant teachings.

Circuit 80 provides spur short circuit protection. Circuit 80 is similar to the short circuit detector 66 discussed above with reference to FIG. 4 and so is not discussed in detail here. If a short circuit occurs across the spur connection, due to a cable short circuit or a faulty field device, the power to the faulty load will be switched off while all the rest of the field devices continue to be powered and communicate without any loss of signal or any additional voltage drop across the main network cable segment. In typical implementations of a redundant fieldbus system according to the present invention, the main network cable segment operates at a higher voltage because the current use by faulty devices is avoided. Circuits 82 and 84, representative of n spurs in this example, are similar to circuit 80 and are not described separately here for purposes of conciseness.

As discussed above, fieldbus networks are characterized in that they provide DC power to attached field devices, such as controllers, actuators and sensors, and carry bidirectional digital communications between a system controller and the various field devices attached to the network segment. The digital communications are carried by an AC carrier that is, in many circumstances, a 31.25 kHz carrier signal as defined by the IEC 61158-2 standard. Particularly preferred implementations of the present invention can be implemented in FOUNDATION Fieldbus and PROFIBUS types of networks. Additional information regarding applications and configurations of advantageous fieldbus networks can be found at the websites and in the publications of the FOUNDATION Fieldbus and PROFIBUS organizations. Of course, successors to the present implementations of the standards and networks are anticipated and the present invention will find application in such networks.

In addition, while a single device coupler 44 is illustrated in exemplary FIGS. 2 and 3, it is possible to have multiple device couplers and multiple spans of network cables connected within a particular network. Different numbers of field devices may be provided, in different configurations, on the one or more device couplers. In other implementations, field devices can be attached without using device couplers. FIGS. 2 and 3 show modular configurations for the device couplers and the field devices. While this is presently preferred, it is nevertheless possible for the field devices to include aspects of the device couplers, such as the automatic termination circuitry described above.

The present invention has been described in terms of certain preferred embodiments. Those of ordinary skill in the art will appreciate that various modifications and alterations could be made to the specific preferred embodiments described here without varying from the teachings of the present invention. Consequently, the present invention is not intended to be limited to the specific preferred embodiments described here but instead the present invention is to be defined by the appended claims.

What I claim is:

1. A fieldbus network, comprising:
   a first power supply module comprising a first power supply and host and field power supply paths coupling the first power supply to a host side terminal and to a field side terminal of the first power supply module, respectively, the first power supply module having a first fault detector circuit coupled to a host switch coupled along the host power supply path between the first power supply and the host side terminal and to a field switch coupled along the field power supply path between the first power supply and the field side terminal, the host switch adapted to decouple the first power supply from the host terminal in response to detection of a fault on the host side and the field switch adapted to decouple the first power supply from the field side terminal in response to detection of a fault on the field side;
   a second power supply module comprising a second power supply and host and field power supply paths coupling the second power supply to a host side terminal and to a field side terminal of the second power supply module, respectively, the second power supply module having a second fault detector circuit coupled to a host switch coupled along the host power supply path between the second power supply and the host side terminal and to a field switch coupled along the field power supply path between the second power supply and the field side terminal, the host switch adapted to decouple the second power supply from the host terminal in response to detection of a fault on the host side and the field switch adapted to decouple the second power supply from the field side terminal in response to detection of a fault on the field side; and
   first and second fieldbus cables coupled in parallel to a field device, the first fieldbus cable coupled between the field side terminal of the first power supply and the field device and the second fieldbus cable coupled between the field side terminal of the second power supply and the field device.

2. The fieldbus network of claim 1, further comprising a device coupler providing a first current path between a first set of terminals and the field device and a second current path between a second set of terminals and the field device, the first set of terminals connected to the first fieldbus cable and the second set of terminals connected to the second fieldbus cable, the first power supply provides power to the field device only over the first fieldbus cable and the first current path and the second power supply provides power to the field device only over the second fieldbus cable and the second current path, wherein during fault free operation both the first power supply and the second power supply power the field device.

3. The fieldbus network of claim 2, wherein the first fault detector includes a short circuit detector and an open circuit detector and wherein while the first fault detector detects a fault, the fieldbus network powers the field device only over the second fieldbus cable.

4. The fieldbus network of claim 1, wherein the first fault detector includes a first open circuit detector coupled to the host side, a second open circuit detector coupled to the field side, and a short circuit detector coupled to both the host side and the field side.

5. The fieldbus network of claim 1, wherein the second fault detector includes a short circuit detector and an open circuit detector wherein when the second fault detector detects a fault, the fieldbus network powers the field device over the first fieldbus cable.

6. The fieldbus network of claim 1, wherein the second fault detector includes a first open circuit detector coupled to the host side, a second open circuit detector coupled to the field side, and a short circuit detector coupled to both the host side and the field side.

7. The fieldbus network of claim 1, wherein the host side terminal of the first power supply module is coupled to a first noise filter and wherein the field side terminal of the first power supply is coupled to the first noise filter and wherein the first noise filter passes bidirectional communication signals between the host side terminal and the field side terminal of the first power supply module at least when no fault is present on the host side and the field side of the first power supply module.

8. The fieldbus network of claim 7, wherein the host side terminal of the second power supply module is coupled to a second noise filter and wherein the field side terminal of the second power supply is coupled to the second noise filter and wherein the second noise filter passes bidirectional communication signals between the host side terminal and the field side terminal of the second power supply module while the first fault detector detects a fault.

9. The fieldbus network of claim 1, further comprising an automatic termination circuit that terminates a connection between the first and second fieldbus cables in response to a fault on one of the first and second fieldbus cables, the termination circuit coupled between the first fieldbus cable and the field device and between the second fieldbus cable and the field device.

10. The fieldbus network of claim 2, the device coupler further comprising an automatic termination circuit that terminates a connection between the first and second fieldbus cables in response to a fault on one of the first and second fieldbus cables, the automatic termination circuit coupled between the first fieldbus cable and the field device and between the second fieldbus cable and the field device.

11. The fieldbus network of claim 1, further comprising a static termination circuit coupled to both of the first and second power supply modules.

12. The fieldbus network of claim 2, further comprising a first static termination circuit coupled to both of the first and second power supplies and a second static termination circuit within the device coupler.

* * * * *